(12) United States Patent
Habibvand

(10) Patent No.: US 8,651,810 B2
(45) Date of Patent: Feb. 18, 2014

(54) BALL BEARING AND PUMP FOR CRYOGENIC USE

(75) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 571 days.

(21) Appl. No.: 12/967,400

(22) Filed: Dec. 14, 2010

(65) Prior Publication Data

US 2011/0129327 A1    Jun. 2, 2011

Related U.S. Application Data

(63) Continuation-in-part of application No. 12/204,886, filed on Sep. 5, 2008, now abandoned.

(51) Int. Cl.
*F04D 29/04* (2006.01)

(52) U.S. Cl.
USPC .......................................... 415/229

(58) Field of Classification Search
USPC ................. 415/229; 384/520; 417/423.1, 901
See application file for complete search history.

(56) References Cited

U.S. PATENT DOCUMENTS

| | | | | |
|---|---|---|---|---|
| 3,790,239 | A * | 2/1974 | Laux et al. | 384/463 |
| 4,277,117 | A * | 7/1981 | George | 384/520 |
| 5,486,052 | A * | 1/1996 | Sibley et al. | 384/463 |
| 2002/0094286 | A1* | 7/2002 | Nguyen et al. | 417/420 |

* cited by examiner

*Primary Examiner* — Edward Look
*Assistant Examiner* — Maxime Adjagbe
(74) *Attorney, Agent, or Firm* — MKG, LLC

(57) ABSTRACT

A ball bearing for a cryogenic application including an inner ring and an outer ring positioned around the inner ring. The inner ring and the outer ring define a raceway therebetween. The ball bearing includes a plurality of rolling balls disposed in the raceway and a slug separator positioned between and slidingly engaging each of adjacent pairs the rolling balls. The slug separator defines an exterior surface thereon, which has a recess extending at least partially into the slug separator. The recess is configured to flow cryogenic fluid therethrough.

6 Claims, 3 Drawing Sheets

BALL BEARING AND PUMP FOR CRYOGENIC USE

CROSS-REFERENCE TO RELATED APPLICATIONS

This application is a continuation in part of U.S. patent application Ser. No. 12/204,886, filed Sep. 5, 2008, which claims the benefit of U.S. provisional application No. 60/967,540 filed Sep. 5, 2007, both of which are incorporated herein by reference in their entirety.

FIELD OF THE INVENTION

This invention is directed to bearings and in particular to ball bearings used in cryogenic applications.

BACKGROUND

Ball bearings used in cryogenic applications have to function at temperatures of about −130° C. to about −270° C. (about −200° F. to about −450° F.). For example, such ball bearings are used in pumps that are submerged in liquefied natural gas (LNG), or in turbo-pumps of rocket engines burning liquid hydrogen (LH2) with liquid oxygen (LOX). The bearings comprise balls held in place by cages and normally run at high speeds and carry significant loads.

The robustness of a ball bearing is significantly reduced in cryogenic applications relative to the performance of the ball bearing at room temperature. For example, materials can become quite brittle in cryogenic applications, necessitating a variety of design reinforcement measures such as the addition of metallic shrouds, side plates, riveting, etc, when one-piece cage designs are used. A common failure mode of ball bearings in cryogenic applications is failure of the bearing cage. The significant differences between the coefficient of thermal contraction (CTC) of metallic bearing rings, metallic cage reinforcement components, and non-metallic cage materials further add to the complexity of designing a bearing for cryogenic use.

Pumps used for cryogenic aerospace applications, and the bearings therein, are not only subject to the severity of cryogenic temperatures, but also to limitations on pump weight. In addition, no active lubrication of the bearings in the usual sense is available or feasible. One lubrication effect provided to a bearing in such a pump, if any, is often limited to the result of a bypass flow of the cryogenic fluid (for example, LNG, LH2 or LOX) through the bearing. However, such bypass flow is restricted due to limited clearances within the bearing.

A bearing cage material can serve as a source of limited "transfer lubrication" in cryogenic bearings. Cage materials made from Teflon®-based composite materials such as Armalon™ and Rulon™ have been used in severe cryogenic applications. In relatively less severe applications, such as pumping LNG, phenolic composites have been employed as materials for cages, with mixed results.

It is an object of this invention to provide a cryogenic bearing (that is, a bearing for cryogenic applications) that improves upon prior art cryogenic bearings.

SUMMARY OF THE INVENTION

The present invention resides in one aspect in a ball bearing for a cryogenic application including an inner ring and an outer ring positioned around the inner ring. The inner ring and the outer ring define a raceway therebetween. The ball bearing includes a plurality of rolling balls disposed in the raceway and a slug separator positioned between and slidingly engaging each of adjacent pairs of the rolling balls. The slug separator defines an exterior surface thereon, which has a recess extending at least partially into the slug separator. The recess is configured to allow cryogenic fluid to flow therethrough.

In another aspect of the present invention the recess is a recess extending circumferentially around the slug separator.

The present invention resides in another aspect in an improved pump operable with a cryogenic fluid. The pump comprises a housing having an inlet and an outlet for a fluid and an impeller rotatably mounted and supported in the housing by a pair of ball bearings. Each ball bearing includes an inner ring and an outer ring positioned around the inner ring. The inner ring and the outer ring define a raceway therebetween. The ball bearing includes a plurality of rolling balls disposed in the raceway and a slug separator positioned between and slidingly engaging each of adjacent pairs of the rolling balls. The slug separator defines an exterior surface thereon which has a recess extending at least partially into the slug separator. The recess is configured to allow cryogenic fluid to flow therethrough.

The present invention resides in still another aspect in a method for pumping a fluid under cryogenic conditions, by using a pump as described herein.

DETAILED DESCRIPTION OF THE INVENTION

Figure 1:
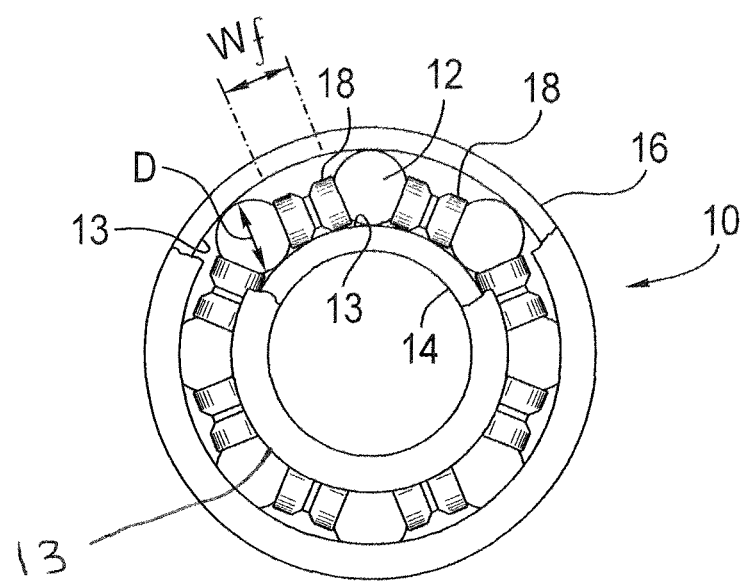
FIG. 1 is a schematic plan view of a Conrad-type (deep-groove) cryogenic ball bearing for use in a pump as described herein.

The present invention is directed to a ball bearing for cryogenic applications, for example, for use in pumps that pump cryogenic fluids. According to this invention, the ball bearing does not employ a cage to separate the rolling balls in the bearing. Instead, the bearing comprises slug ball separators between adjacent rolling balls. As described below, the slug ball separators define an exterior surface having a recess therein for promoting the flow of the cryogenic fluids though the bearing for lubrication thereof. As a result of using the slug ball separators instead of a cage, a ball bearing meeting the same design constraints as a caged ball bearing can employ larger balls thus significantly increasing dynamic load rating and fatigue life of the bearing. Optionally, the slug ball separators may be individually fitted between adjacent rolling balls in the bearing.

The slug ball separators are manufactured from a synthetic polymeric material as described in detail below. In addition, when using synthetic polymeric material the slug ball separators do not include any metallic parts such as metallic strengthening fibers or lattice structures embedded in, surrounding or otherwise coupled or mated to the synthetic polymeric material. Accordingly, the slug ball separators have a uniform CTC with no stresses imposed by different thermal contraction or expansion rates of different materials when the temperature of the slug ball separators are changed. In contrast, conventional one-piece cages generally include both metallic and nonmetallic cage reinforcement materials resulting in a non-uniform CTC and can therefore be subject to significant stresses caused by different thermal contraction and expansion rates of the different materials during temperature changes. Thus the slug separators of the present invention can maintain a more uniform engagement with the rolling balls over a wide range of temperatures from ambient to cryogenic, compared to bearings using cages with metallic and non-metallic components. In addition, because of the lower stresses, the slug separators have a longer life compared to conventional bearings which employ cages having metallic and non-metallic components.

The slug ball separators of the present invention are not in a fixed position with respect to each other as is the case for ball pockets in conventional one-piece ball cages. Instead, the slug ball separators are free to move relative to the balls, an inner ring, an outer ring and each other. In one embodiment, the slug ball separators are manufactured from an elastomeric material which allows the slug separators to elastically compress and expand in response to forces imposed on them by the rolling balls. During operation, the rolling balls travel in and out of high load zones in the bearing which can impose forces on the balls tending to reduce the speed of the balls in the high load zone, compared to other zones in the bearing. As a result, the rolling balls in the high load zone tend to lag behind lead balls in other zones (i.e., lead-lag movement of the rolling balls). The slug separators are floating freely to compensate for the different speeds of the balls. In contrast, one-piece cages typically constrain the balls to travel together, thereby imposing forces on the cage which can cause degradation of the cage. In addition, the free-floating slug separators enables them to move with respect to the inner and outer races, for example allowing the slug separators to move axially and radially while maintaining engagement with the respective rolling balls.

Figure 5:
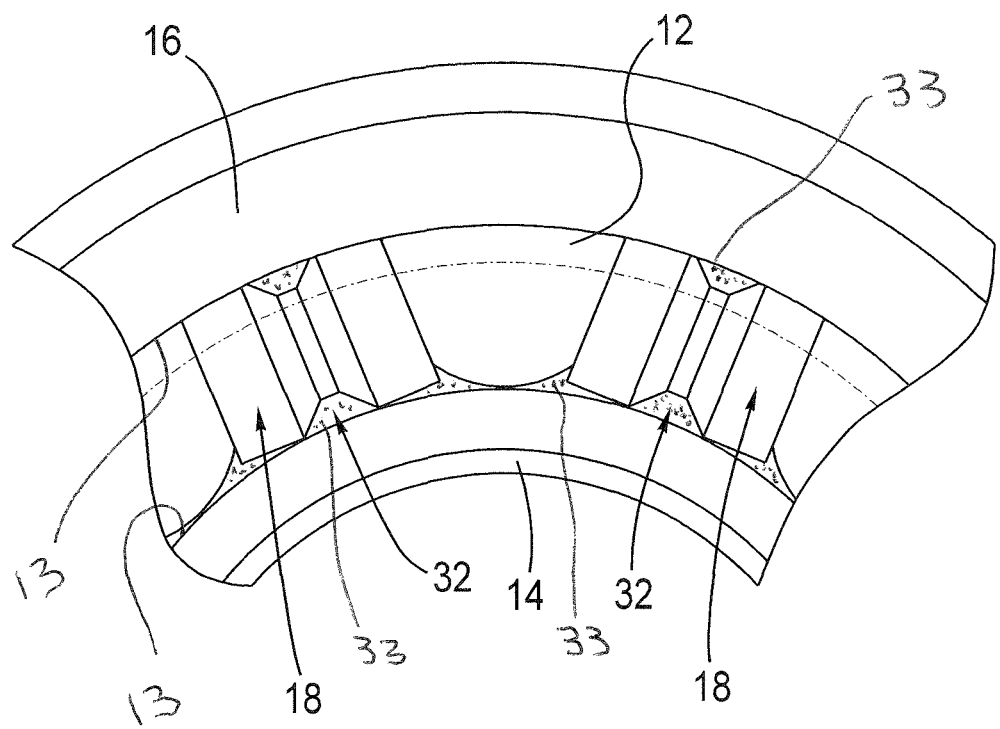
FIG. 5 is a plan view of a portion of a bearing having slug separators disposed therein.

One embodiment of a ball bearing for use in a cryogenic application is shown in FIGS. 1 and 5. The ball bearing 10 (a "cryogenic ball bearing") includes an inner ring 14 and an outer ring 16 positioned around the inner ring. The ball bearing 10 also includes a plurality of rolling balls, for example eight rolling balls 12 disposed between the inner ring 14 and the outer ring 16. The inner and outer rings 14 and 16, respectively, define a raceway 13 shaped complimentary to a circumference of the rolling balls 12. The rolling balls 12 travel in the raceway 13.

Figure 4:
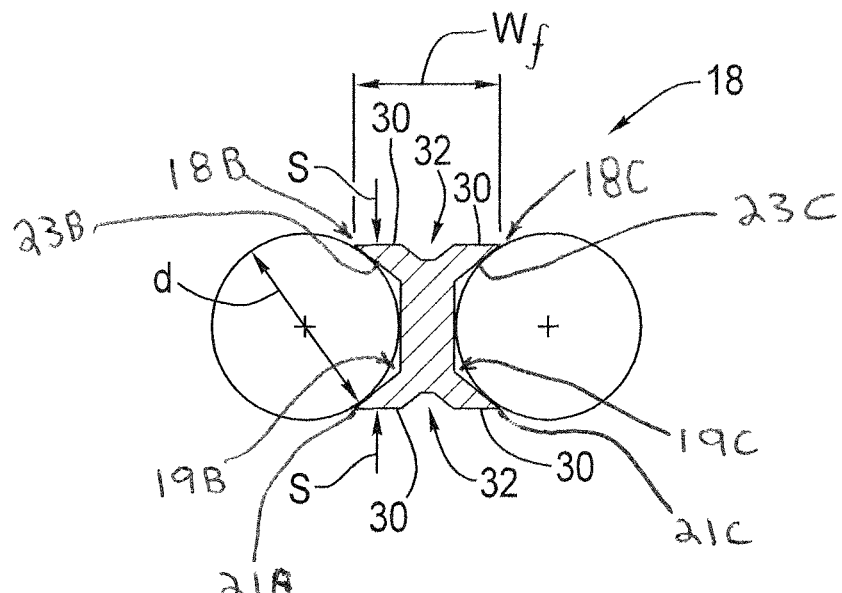
FIG. 4 is a side cross sectional view of a slug separator.

Referring to FIGS. 1, 4 and 5, a slug ball separator 18 is positioned between and slidingly engages each adjacent pair of the rolling balls 12. The slug ball separators 18 have an axial length $W_f$ measured from end to end. The axial length $W_f$ is about equal to the diameter D of the balls, or larger than the ball diameter, for example $W_f$ is up to about two times the ball diameter D. The diameter S of the slug ball separator 18, however, is less than the ball diameter D thereby allowing the slug ball separator to slide on the rolling ball and travel between the inner and outer rings 14 and 16, respectively, without being obstructed by the raceway 13. In addition, use of the slug separator 18 with the length $W_f$ greater than the ball diameter D and up to about two times the ball diameter and having a diameter S less than the ball diameter D, provides the unexpected result of allowing the slug separator to flex and compress during operation, thereby accommodating fluctuating loads in the bearing and varying ball speeds. While the length $W_f$ of the slug separator 18 is described as being about equal to the diameter D of the balls 12, or larger than the ball diameter, the present invention is not limited in this regard as slug separators having a length $W_f$ less than the diameter D of the balls 12 can also be employed without departing from the broader aspects of the present invention.

In one embodiment, the slug ball separator 18 for use in the cryogenic ball bearing 10 is manufactured from a hard plastic material. In one embodiment, the slug ball separator 18 is cut from a solid cylindrical stock of material made from a synthetic polymeric material such as bearing grade PTFE (polytetrafluoroethylene) (such as TEFLON®), polyamide (Nylon), Rulon® PTFE compounds, PFA (perfluoroalkoxyethylene), PEEK, Rulon®, or Vespel®. In one embodiment, the slug ball separators 18 are manufactured from a metallic material such as bronze, brass or stainless steel. While the slug ball separator 18 is described as being cut from a cylindrical stock of material, the present invention is not limited in this regard, as the slug ball separator can be manufactured as from tubular stock (for example as shown in FIG. 2) or individual pieces such as by molding to near net final shape.

The cryogenic ball bearing 10 can be a Conrad-type (deep-groove) bearing when slug material is pliable or elastic. If the slug material is hard or non-elastic then filling slots must be formed in the Conrad-type bearing to permit assembly. Alternatively, when using a hard or non-elastic slug material, an angular-contact type bearing can be used to permit assembly.

Figure 2:
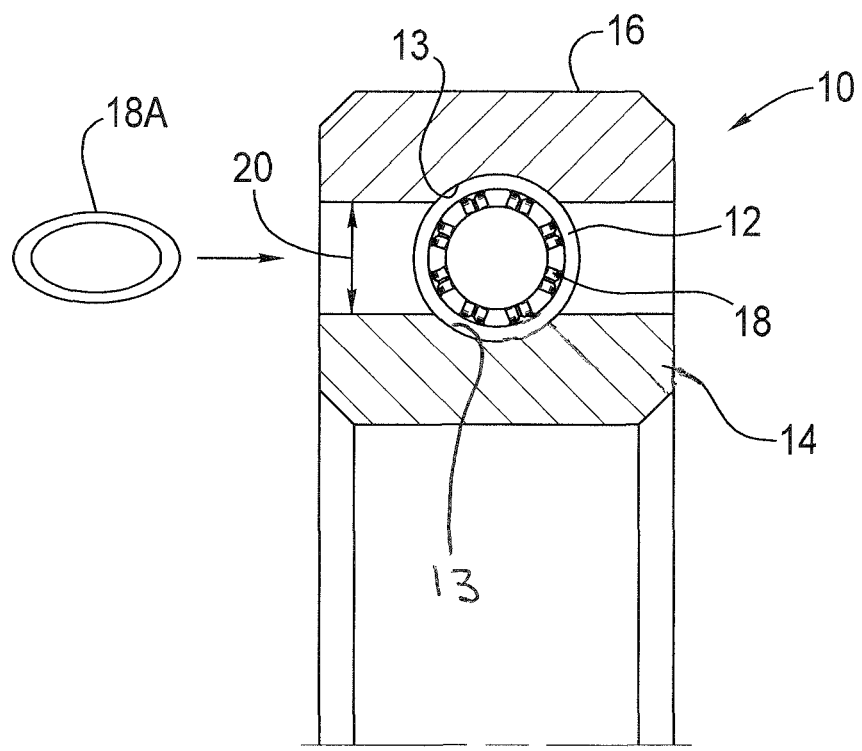
FIG. 2 is a partial, cross-sectional view of the ball bearing of FIG. 1.

As shown in FIG. 2, in one embodiment, the material of the tube stock is selected so that the separators 18 are resilient at ambient temperatures. As shown in FIG. 2, the tube stock of the slug separator 18A is hollow. The separators 18 can therefore be compressed radially and will regain a circular cross-sectional configuration after the compression force is removed. When a Conrad-type bearing 10 is being assembled at ambient temperatures, the separators 18 can be compressed radially into an oval cross-sectional shape 18A as shown in FIG. 2. So compressed, the separators 18 can be inserted through a gap 20 between the inner ring 14 and the outer ring 16 of the bearing 10 for placement between adjacent rolling balls 12, as indicated in FIG. 2. Therefore, there is no need to chamfer either the inner ring 14 and/or the outer ring 16 to accommodate the insertion of a cage in the raceway. Accordingly, the cryogenic ball bearing 10 is stronger than a comparative prior art, caged bearing having like dimensions. Another advantage of ball bearing 10 over prior art caged bearings is that the slug ball separators 18 orbit and move with minimal resistance to lead-lag movement of the rolling balls 12 as the inner ring 14 or outer ring 16 of the bearing 10 rotates. These advantages are achieved without impact on bearing features such as contact angle, pitch diameter and the number of balls in the bearing.

As shown in FIGS. 1, 4 and 5, the slug ball separator 18 defines a cylindrical exterior surface 30 extending between axial ends 18B and 18C of the slug ball separator. The exterior surface 30 has a recess 32 (e.g., a groove) formed therein and extending circumferentially around the slug ball separator. The axial end 18B of the slug ball separator 18 has recess 19B formed therein and the axial end 18C of the slug ball separator 18C has a recess 19C formed therein. The recess 19B tapers radially and axially inward from a peripheral circumference 21B of the slug ball separator 18 and defines a ball receiving surface 23B. The recess 19C tapers radially and axially inward from a peripheral circumference 21C of the slug ball separator 18 and defines a ball receiving surface 23C. When installed in the bearing 10, the recess 32 provides a flow path around the slug ball separator 18 and between the slug ball separator and the raceway through which the cryogenic fluid 33 flows. Such flow promotes lubrication, by the cryogenic fluid 33, of the rolling balls 12, raceways 13 and slug ball separators 18 as well as contact points therebetween. The slug separator 18 is disposed in the raceway 13 with a portion of the ball receiving surface 23B slidingly engaging one of the balls 12 and the ball receiving surface 23C slidingly engaging an adjacent one of the balls 12. The recess 32 is positioned in the raceway 13 traverse to the raceway 13, so that the cryogenic fluid 33 flows through the recess 32. The recess 32 is positioned between the axial end 18B and the axial end 18C of the slug separator 18 and when installed in the bearing is spaced apart from the balls 12. Although the recess 32 is shown and described as being formed in the exterior surface 30, other configurations can be employed, including but not limited, to slug hall separators with one or more perforations, holes, cuts or the like extending through or partially through the slug ball separator.

Figure 3:
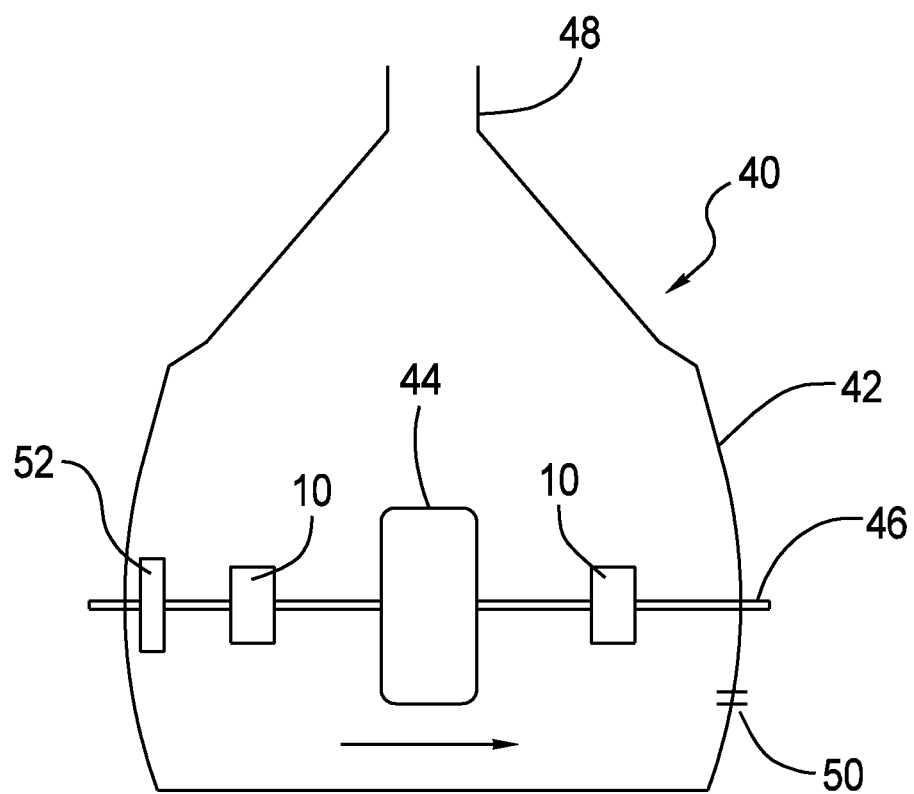
FIG. 3 is a schematic view of the bearing of FIG. 1 in a pump for a cryogenic fluid.

FIG. 3 illustrates a pump 40 comprising a housing 42 which encloses an impeller 44 that is mounted on an axle 46. The axle 46 is supported in the housing 42 by two bearings 10 as described above, to facilitate rotation of the impeller 44 in the housing 42 even at cryogenic temperatures. The housing 42 also defines an inlet 48 and an outlet 50 to accommodate flow of a cryogenic fluid through the housing 42 so that the rotation of the impeller 44 can generate a fluid flow through the housing. A motor 52 rotates the impeller 44 by rotating the axle 46. The motor 52 may optionally be disposed in the housing 42, as shown, but in other embodiments, a motor may be positioned outside the housing. An output flow conduit can be attached to the outlet 50 so that the pump 40 can deliver the cryogenic fluid to a desired location via the output flow conduit.

The pump 40 may be a submersible pump and be submerged in a cryogenic fluid to draw fluid into the inlet 48 so that the pump 40 can flow the fluid to the outlet 50. During operation of the pump, the cryogenic fluid flows through the gap 20, between the rolling balls 12, raceways 13 and slug ball separators 18 and through the recess 32, providing lubrication thereto. Alternatively, the pump 40 may comprise a turbopump or another kind of non-submerged pump.

The bearings 10 work in the pump 40 at cryogenic temperatures, optionally without design reinforcement measures such as the addition of metallic shrouds, side plates, riveting, etc.

The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A ball bearing for a cryogenic application comprising:
an inner ring;
an outer ring positioned around the inner ring;
the inner ring and the outer ring defining a raceway therebetween;
a plurality of rolling balls disposed in the raceway;
a plurality of slug separators, each of the plurality of slug separators having a cylindrical exterior surface extending between a first axial end and a second axial end of the slug separator, the exterior surface having a first recess formed therein and extending circumferentially around the slug ball separator, the first axial end of the slug ball separator has a second recess formed therein and the second axial end of the slug ball separator has a third recess formed therein, the second recess tapers radially and axially inward from a first peripheral circumference of the slug ball separator and defines a first ball receiving surface, the third recess tapers radially and axially inward from a second peripheral circumference of the slug ball separator and defines a second ball receiving surface;
wherein at least a portion of said second recess and third recess is planar and perpendicular to said cylindrical exterior surface;
one of the plurality of slug separators is disposed in the raceway with a portion of the first ball receiving surface slidingly engaging one of the plurality of rolling balls and the second ball receiving surface slidingly engaging an adjacent one of the plurality of rolling balls; and
the first recess is positioned in the raceway and spaced apart from adjacent ones of the plurality of rolling balls for flowing a cryogenic fluid through the first recess.

2. The ball bearing of claim 1 wherein the slug separators are resilient at room temperature to permit their insertion into the bearing through a gap between the inner ring and the outer ring.

3. The ball bearing of claim 1 wherein the slug separators are formed from material comprising bearing grade PTFE, polyimide, polyamide (Nylon), or PFA.

4. The ball bearing of claim 1 wherein the slug separator has a length at least about equal to a diameter of the rolling balls.

5. The ball bearing of claim 1, wherein the slug separator is hollow.

6. The ball bearing of claim 1, wherein the first recess is positioned between the first axial end and the second axial end of each of the plurality of slug separators.

* * * * *